July 9, 1940.  M. WEBER  2,207,527
CONSTANT LEVEL APPARATUS
Filed Oct. 26, 1936　　2 Sheets-Sheet 1
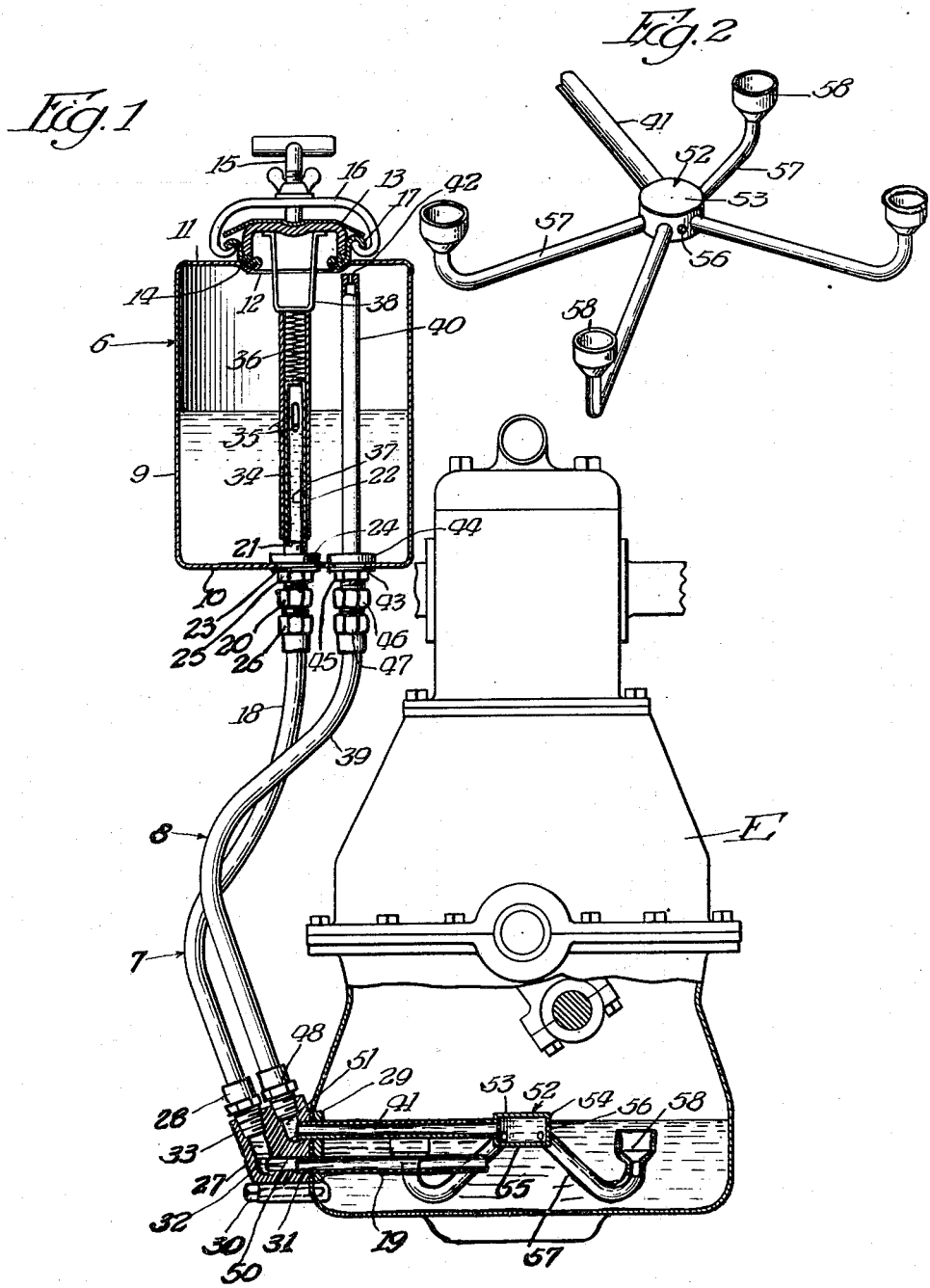

July 9, 1940. M. WEBER 2,207,527
CONSTANT LEVEL APPARATUS
Filed Oct. 26, 1936 2 Sheets-Sheet 2
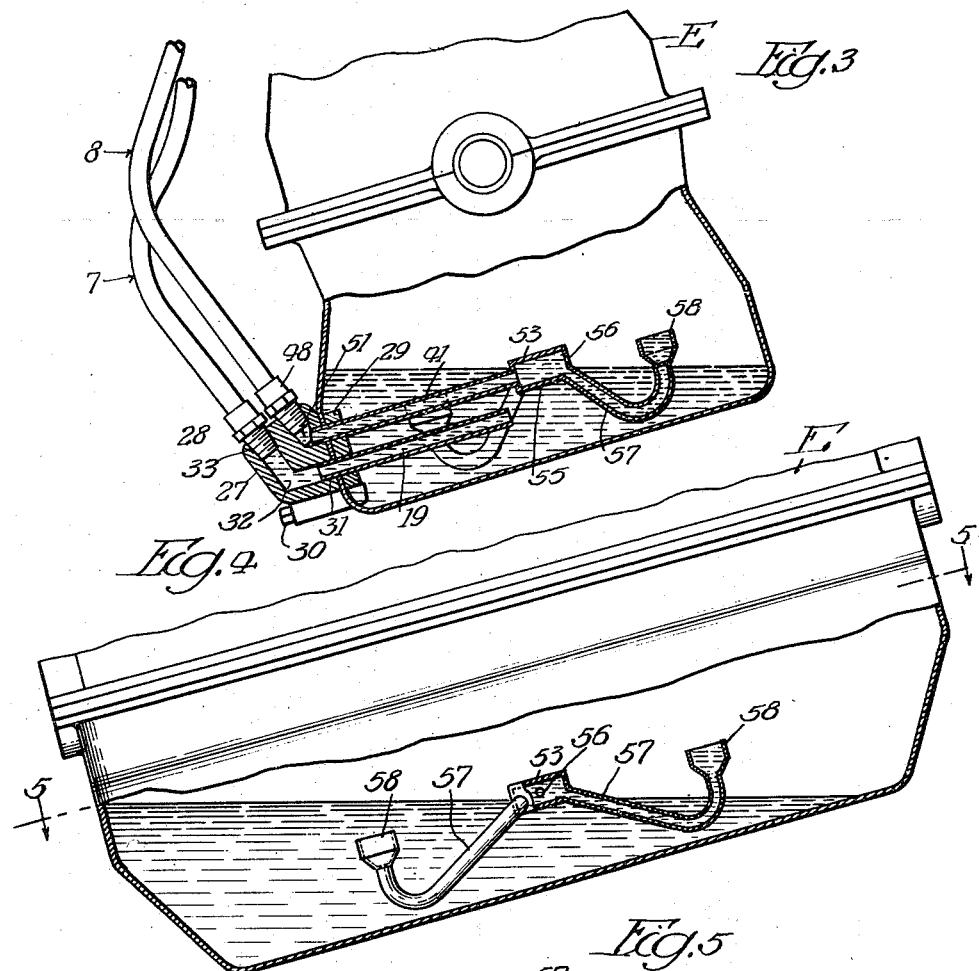
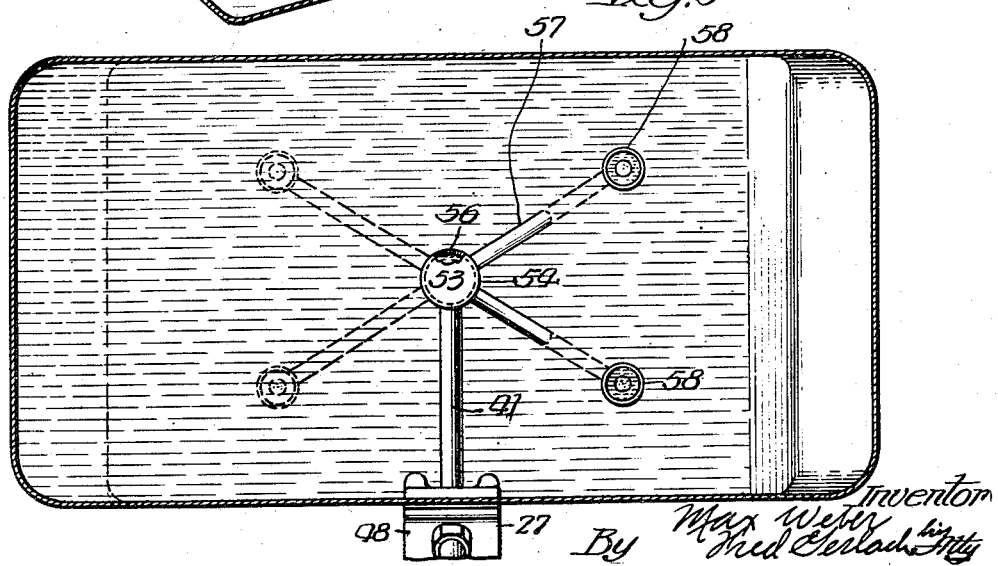

Patented July 9, 1940

2,207,527

UNITED STATES PATENT OFFICE 2,207,527

CONSTANT LEVEL APPARATUS

Max Weber, Chicago, Ill., assignor to Norman H. Gerlach, Chicago, Ill.

Application October 26, 1936, Serial No. 107,523

10 Claims. (Cl. 184—103)

The present invention relates generally to apparatus for constantly maintaining oil at the optimum or full level in the crank case of an internal combustion engine. More particularly the invention relates to that type of constant level apparatus which is adapted for use in connection with an automobile or like engine driven vehicle and comprises (1) an air tight reservoir which is located outside of the engine and above the crank case and contains a supply of oil for feed to the crank case; (2) a feed pipe which extends between the bottom of the reservoir and a point in the crank case of the engine beneath the optimum oil level and serves to feed the oil in the reservoir to the crank case when the reservoir is vented, that is, when air is introduced into the reservoir; and (3) a vent pipe which has one end thereof leading to the top of the reservoir, embodies at its other end a tube extending through the crank case and terminating at its inner end at the optimum oil level and adjacent to the intersection of the longitudinal and transverse centers of the crank case, and is adapted when the oil in the crank case drops below its optimum or full level and exposes to atmosphere the inner end of the tube to introduce air into the reservoir for oil feeding purposes.

In an apparatus of this type it has been found in practice that although the inner end of the tube at the crank case end of the vent pipe is located adjacent to the intersection of the longitudinal and transverse centers of the crank case where the oil supposedly remains at a constant height with respect to the crank case bottom, that is, does not drop beneath the level of the inner end of the tube when the engine tilts laterally or longitudinally as the result of travel of the automobile with which the apparatus is associated over sloping roadways, the oil in the crank case sometimes builds up above the optimum or full level. This is attributable to the fact that sometimes due to the drive of the automobile over an exceptionally rough roadway or an abrupt or sharp application of the brakes the tilting of the motor or the resultant surge of oil in the crank case is of such magnitude that the inner end of the tube at the crank case end of the vent pipe becomes momentarily exposed to atmosphere with the result that there is a small feed of oil to the crank case even though the oil in the crank case is of sufficient volume to reach the optimum level when the engine is in its normal position.

One object of the invention is to provide a constant level apparatus of the aforementioned type which includes simple and novel means for preventing venting of the reservoir whenever the inner end of the tube at the crank case end of the vent pipe is momentarily exposed as a result of excessive tilting of the engine or surging of the oil in the crank case, and hence effectively and positively fulfills its intended purpose and does not permit of an unwanted building up of the oil in the crank case above its optimum or full level. In general this means comprises a plurality of U-shaped tubes which are connected fixedly to and radiate from the inner end of the tube of the vent pipe, have the outer ends thereof disposed beneath the optimum or full oil level with the result that they are normally filled with oil, and are so arranged that when for any reason the engine tilts or the oil in the crank case surges so excessively that the inner end of the tube is momentarily exposed to atmosphere, the U-shaped tubes on the high side of the crank case or farthest from the surged oil operate to feed the oil therein into the vent pipe tube and thus prevent venting of the receptacle.

Another object of the invention is to provide a constant level apparatus of the last mentioned character in which the U-shaped tubes which constitute the means for preventing venting of the reservoir whenever the inner end of the tube at the crank case end of the vent pipe is momentarily exposed as the result of excessive tilting of the engine or surging of the oil in the crank case are four in number and extend toward the corner portions of the crank case of the engine with which the apparatus is associated.

A further object of the invention is to provide a constant level apparatus of the type last mentioned in which the U-shaped tubes which are connected to and extend radially from the inner end of the vent pipe tube have enlarged cup-shaped outer ends in order that their oil containing capacity is sufficient for their intended purpose.

A still further object of the invention is to provide an apparatus which serves efficiently to maintain constancy of oil level in the crank case of an engine and is an improvement upon that which forms the subject matter of United States Letters Patent No. 2,081,315, granted to me May 25, 1937.

Other objects of the invention and the various advantages and characteristics of the present constant level apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a view partly in elevation and partly in section of an automobile engine to which is applied a constant level apparatus embodying the invention;

Figure 2 is a perspective of the U-shaped tubes which constitute the means whereby venting of the reservoir is prevented when the inner end of the vent pipe tube is momentarily exposed as a result of excessive tilting of the engine or surging of the oil in the crank case;

Figure 3 is a transverse sectional view showing the manner in which the U-shaped tubes at the high side of the crank case serve to supply oil into the inner end of the vent pipe tube when the engine is tilted laterally;

Figure 4 is a longitudinal sectional view illustrating the manner in which the U-shaped tubes at the high side of the crank case operate to supply oil into the inner end of the vent pipe tube when the engine is tilted longitudinally; and Figure 5 is a horizontal section on the line 5—5 of Figure 4.

The apparatus which is shown in the drawings constitutes the preferred embodiment of the invention. It is adapted primarily for use in connection with an automobile engine E and operates automatically as hereinafter described, to maintain the oil in the crank case of the engine at its optimum or full level. The engine is shown in a diagrammatic manner and with the optimum amount or quantity of oil in the crank case. The apparatus is adapted to be supported in any suitable manner and comprises a reservoir 6, a feed pipe 7 and a vent pipe 8.

The reservoir 6 is located outside of the engine E and above the crank case of the latter. It contains a supply of oil for feed to the crank case of the engine by way of the feed pipe 7 and consists of a cylindrical side wall 9, a circular bottom 10, and a circular top 11. The top 11 of the reservoir is provided with a circular opening 12 whereby the reservoir may be filled with oil whenever necessary. This opening is normally closed by a cover 13 so that the receptacle is air tight. As shown in Figure 1 of the drawings, the cover 13 bears against a gasket 14 around the opening 12 and is releasably held in clamped relation with the top by means of a bolt 15. The latter extends through and is carried by a bail 16, which is arranged in hooked relation with an out-turned annular flange 17 around the opening 12 in the reservoir top 11. Whenever it is desired to remove the cover for reservoir refilling purposes it is only necessary to loosen the bolt 15 and then unhook the bail 16 from the flange 17. This operates to release the cover so that it may be withdrawn from the gasket 14 around the opening 12.

The feed pipe 7 of the apparatus extends between the reservoir 10 and the crank case of the engine E and operates, as hereinafter described, to feed oil from the reservoir to the crank case when the reservoir is vented as a result of the oil in the crank case dropping beneath its optimum level. As shown in Figure 1, the feed pipe 7 consists of an upper pipe section 18 and a lower pipe section 19. The section 18 extends substantially vertically and embodies at its upper end a nipple 20 and a tube 21. The tube is disposed in and extends vertically through the central portion of the reservoir 6 and embodies at its lower end a hole 22 whereby oil in the reservoir is permitted to flow downwards into the feed pipe 7 when the reservoir is vented. The extreme lower end of the tube 21 extends through an aperture 23 in the central portion of the reservoir bottom 10 and is held in clamped relation with the receptacle bottom by means of a collar 24 and a nut 25 beneath the collar. The upper end of the nipple 20 fits within and is threaded to the extreme lower end of the tube 21 and the lower end of the nipple is connected by a coupling 26 to the upper end of the upper pipe section 18 of the feed pipe. The lower end of the upper pipe section is connected to a fitting 27 by means of a coupling 28. The fitting, as shown in Figures 2 and 3, is located against the central portion of one of the side walls of the crank case and is clamped in place by means of a backing plate 29 and a pair of bolts 30. The backing plate is disposed within the crank case and the bolts extend through this plate and into the fitting. The lower pipe section 19 is disposed in and extends transversely of the crank case of the engine E. It is positioned so that it extends horizontally when the engine E is in its normal horizontal position and is arranged so that the inner end thereof is disposed beneath the optimum level of the oil in the crank case and substantially at the intersection of the longitudinal and transverse centers of the crank case. By so arranging or locating the inner end of the lower pipe section the crank case end of the feed pipe is always covered by the oil in the crank case against entry of air therein regardless of the degree to which the engine may be tilted or rocked for short periods during operation thereof. The outer end of the lower pipe section 19 extends through the backing plate 29 and the adjacent side wall of the crank case. It fits within an internally threaded socket 31 in the lower portion of the fitting 27 and communicates with the lower end of the upper pipe section 18 by way of an L-shaped duct 32 in the fitting. The lower end of this duct forms the socket 31 for the outer end of the lower pipe section 19 and the upper end of the duct forms an internally threaded socket 33 in which the coupling 28 fits. When the reservoir is vented, as hereinafter described, due to dropping of the oil in the crank case of the engine beneath its optimum level oil flows from the reservoir 9 into the crank case. The course of the oil is as follows: hole 22; tube 21; nipple 20; upper pipe section 18; duct 32; and lower pipe section 19. In order to close the feed pipe 7 against the flow of oil therethrough from the reservoir to the crank case when the reservoir is opened for refilling purposes a slide valve 34 is provided. This valve is mounted for vertical sliding movement on the tube 21 and is the same in design and construction as that which is shown and described in my aforesaid patent application Serial Number 708,408. A pin and slot connection 35 serves to limit sliding movement of the valve with respect to the sleeve, and a compression spring 36 is disposed within the upper end of the valve and urges the valve upwards. The lower end of the valve has a hole 37 which when the sleeve is shifted downwards as far as possible against the force of the spring registers with the hole 22 in the tube and results in communication being established between the reservoir and the feed pipe 7. A bracket 38 on the cover 13 operates to hold the valve in its lowered position against the force of the spring when the cover is in place on the receptacle. When the cover is removed the spring urges the valve upward into a position wherein the hole 37 is out of registry with the hole 22 and communication between the reservoir and the feed pipe is thus cut off.

The vent pipe 8 serves to vent the reservoir 6 for oil feeding purposes when the oil in the crank case of the engine drops below its optimum level. It leads from the reservoir to the crank case and comprises an upper pipe section 39 and a pair of tubes 40 and 41. The tube 40 is located at the upper end of the pipe section 39 and is disposed in a vertical position in the reservoir 6 and at one side of the tube 21. The upper end of the tube 40 is disposed directly beneath the top 11 of the reservoir and embodies a small aperture 42. The lower end of the tube 40 extends through a hole 43 in the reservoir bottom 10 and embodies a collar 44 which overlies the portion of the reservoir bottom which defines the hole 43. A nut 45 is mounted on a screw thread on the extreme lower end of the tube 40 and serves to clamp the collar 43 against the reservoir bottom in order fixedly to hold the tube 40 in the reservoir. The pipe section 39 is disposed in an upstanding position outside of the engine E and its upper end is connected to the lower end of the tube 40 by means of a nipple 46. The upper end of this nipple fits within an internally threaded socket in the extreme lower end of the tube 40 and the lower end of the nipple fits within a socket in a coupling 47 on the upper end of the pipe section 39. The lower end of the pipe section 39 is connected by a coupling 48 to the fitting 27. The tube 41 constitutes or forms the crank case end of the vent pipe 8. It is disposed in the central portion of the crank case of the engine E and overlies and extends parallel to the lower pipe section 19 of the feed pipe 7. The outer end of the tube 41 extends through aligned holes in the backing plate 29 in the contiguous portion of the adjoining side wall of the crank case and fits within a socket 50 in the fitting 27. A duct 51 extends between the socket 50 and the coupling 48 at the lower end of the pipe section 39 and provides a communicating connection between the tube 41 and the pipe section 39. The inner end of the tube 41 embodies a cylindrical enlargement 52. This enlargement is arranged so that the axis thereof extends vertically, and comprises a circular top wall 53, a cylindrical side wall 54, and a circular bottom wall 55. The top and bottom walls 53 are imperforate. The side wall 54 extends between and joins the top and bottom walls and embodies an inlet aperture 56. This aperture is disposed at the optimum oil level in the crank case of the engine E and is positioned substantially at the intersection of the longitudinal and transverse centers of the crank case. When the oil in the crank case is at its optimum level the aperture 56 is covered by the oil and hence there is no venting of the reservoir 6 with the resultant feed of oil via the feed pipe 7 to the crank case. When the oil drops below its optimum level so as to expose to atmosphere the aperture 56 air flows through the enlargement 52, the tube 41, the pipe section 39, and the tube 40, into the reservoir with the result that the oil in the reservoir is fed into the crank case via the feed pipe. As soon as the feed of oil is sufficient to bring the oil in the crank case to its optimum level the aperture 56 is covered or closed by the oil and venting of the reservoir with the resultant feed of oil to the crank case is stopped. When the oil in the crank case raises to its optimum level and thus closes the aperture 56 a portion of the oil in the case is drawn up into the vent pipe 8 by the suction in the reservoir resulting from flow of the oil through the feed pipe to the case. When the oil in the crank case drops below its optimum level and exposes to atmosphere the aperture 56 the oil in the feed pipe is forced upwardly into the reservoir by the pressure of the air in the enlargement 56 and the vacuum in the reservoir with the result that the vent pipe is freed for venting purposes. The aperture 42 at the upper end of the tube 40 is of restricted diameter and serves to prevent locking of the oil that is normally drawn up into the vent pipe upon closing of the aperture 56 as set forth and described in detail in Letters Patent of the United States No. 1,972,962, granted to me September 11, 1934. By reason of the fact that the aperture 56 which constitutes the inlet or crank case end of the vent pipe is located adjacent to the intersection of the longitudinal and transverse centers of the crank case there is substantially no change or drop in the level of the oil at the aperture 56 when the engine is tilted laterally or longitudinally for short periods during normal travel of the automobile with which the engine E is associated with the result that during normal operation of the automobile there is substantially no over-feed of oil to the crank case.

In order to prevent venting of the reservoir 6 in the event that the aperture should be uncovered or exposed to atmosphere as the result of an extraordinary tilting of the engine or violent surging of the oil as a result of travel of the automobile over an extremely rough or irregular roadway or the abrupt application of the automobile brakes four U-shaped tubes 57 are provided. These tubes radiate from the enlargement 52 at the inner end of the tube 41 and extend in the direction of the corners of the crank case. With the exception of the outer ends the tubes are of uniform diameter throughout and the internal diameter thereof corresponds to the diameter of the aperture 56. The inner ends of the tubes 57 are suitably joined to the cylindrical side wall 54 of the enlargement 52 and communicate with the interior of the enlargement. The outer ends of the tubes 57 are shaped to form enlarged cups 58. The latter, as shown in Figure 1 of the drawings, are disposed beneath the aperture 56 and the optimum oil level and face upwardly with the result that when the engine is horizontal the tubes 57 are filled with oil. When due to drive of the automobile with which the engine E is associated over an extremely rough roadway the engine tilts sidewise to such an extent that the aperture 56 in the enlargement 52 at the inner end of the tube 41 becomes exposed the oil in the two tubes 57 at the high side of the engine due to the raising or elevation of such tubes, flows into the enlargement 52 and thus seals the aperture 56 so that air is prevented from flowing to the reservoir and causing an unwanted or unnecessary feed of oil into the crank case. After return of the engine to its normal position the two tubes which served or operated to seal the aperture 56 during its momentary exposure to atmosphere move beneath the level of the oil and become charged with oil. In the event that the engine is tilted laterally in the opposite direction to such an extent that the aperture 56 is momentarily exposed the oil in the other two tubes 57 flow into the enlargement 52 and effect sealing of the aperture 56. In the event that during drive of the automobile over an exceptionally rough roadway the engine E is tilted longitudinally to such an extent that the aperture 56 is momentarily exposed to atmosphere the oil in the two tubes 57 at the high side of the engine due to elevation of such tubes above the oil level (see Figure 4) flows into the enlargement 52 and thus seals the aperture 56 against venting of the reservoir 6. In the event that the brakes of the automobile with which the engine E is associated are abruptly or sharply applied and the oil in the crank case as a result surges forwards to such an extent that the aperture 56 in the side wall of the enlargement 52 is momentarily exposed the oil in the tubes that are farthest from the surged oil flows due to its momentum into the enlargement 52 and thus seals the aperture 56 against venting of the reservoir during the time that it is exposed to atmosphere. By having four tubes and arranging them so that they extend towards the corner portions of the crank case the aperture 56 when momentarily exposed as a result of extreme tilting of the engine or violent surging of the oil is sealed regardless of the direction of engine tilting or the direction of the surge of the oil. The cups 58 increase the capacity of the tubes 57 and are preferably of such size that the tubes 57 carry or retain sufficient oil to close the aperture 56 during the longest period of time in which it is likely to be exposed to atmosphere during violent tilting of the engine or surging of the oil in the crank case.

The operation of the apparatus is as follows: When the oil in the crank case is at its optimum level the aperture 56 in the enlargement 52 at the inner end of the tube 41 of the vent pipe is closed to atmosphere and the reservoir 6 is thus locked against feed of oil to the crank case via the feed pipe 7. As soon as the oil in the crank case drops below the optimum or full level as the result of consumption or dissipation within the automobile engine E and as a result exposes the aperture 56, the oil and air within the vent pipe 8 due to the pressure of the atmosphere in the crank case and the suction within the reservoir flow upwards into the reservoir through the aperture 42. As soon as the vent pipe is freed of oil air flows through the vent pipe into the reservoir and as a result of venting of the latter oil flows through the feed pipe 7 into the crank case. When the oil raises to its optimum level and closes the aperture 56 venting of the reservoir ceases and the flow of oil to the crank case via the feed pipe thus stops. When during operation of the automobile with which the engine E is associated tilting of the engine or surging of the oil in the crank case is such that the aperture 56 is momentarily exposed even though there is a sufficient volume of oil in the crank case, the tubes 57 as hereinbefore described operate to feed oil into the enlargement 52 and effect sealing of the aperture 56 during its period of exposure.

The herein described apparatus because it includes the tubes 57 is extremely efficient in operation and will not permit oil to build up in the crank case above the optimum or full oil level.

Whereas the apparatus has been described in connection with the crank case of an internal combustion engine it is to be understood that it has other uses and applications and may be used generally to maintain liquid at a predetermined level in a casing. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. In combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and terminating at the level at which the liquid is to be maintained, and adapted when the liquid in the case drops below said predetermined level and exposes to atmosphere its said other end to introduce air into the reservoir for liquid feeding purposes, a U-shaped tube extending downwardly and outwardly from, and communicating with, said other end of the vent pipe and adapted to be filled with liquid from the case when the case is in normal position and when the case is tilted or the liquid surges in one direction to such an extent that said other end of the vent pipe is momentarily exposed to atmosphere to have the liquid therein flow into said other end of the vent pipe and seal the latter against the inflow of air to the reservoir.

2. The combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and terminating at the level at which the liquid is to be maintained, and adapted when the liquid in the case drops below said predetermined level and exposes to atmosphere its said other end to introduce air into the reservoir for liquid feeding purposes, a plurality of U-shaped tubes extending in different directions from and communicating with said other end of the vent pipe and adapted to be filled with liquid from the case when the case is in normal position and when the case is tilted or the liquid in the case surges to such an extent that said other end of the vent pipe is momentarily exposed to atmosphere to have the liquid therein flow into said other end of the vent pipe and seal the latter against the inflow of air to the reservoir.

3. The combination with an apparatus designed constantly to maintain liquid in a rectangular case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and terminating at the level at which the liquid is to be maintained, and adapted when the liquid in the case drops below said predetermined level and exposes to atmosphere its said other end to introduce air into the reservoir for liquid feeding purposes, four U-shaped tubes radiating from said other end of the vent pipe in the direction of the corner portions of the case and communicating with said other end of the vent pipe and adapted to be filled with liquid from the case when the latter is in normal position and further adapted when the case is tilted or the liquid in said case thereof surges to such an extent that said other end of the vent pipe is momentarily exposed to atmosphere to have the liquid therein flow into the other end of the vent pipe and seal the latter against the inflow of air to the reservoir.

4. The combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and provided with an enlargement with an aperture therein at the level at which the liquid is to be maintained, and adapted when the liquid in the case drops below said predetermined level and exposes said aperture to atmosphere to vent the reservoir, a U-shaped tube extending outwardly from and communicating with said enlargement and adapted to be filled with liquid from the case when the latter is in normal position and further adapted when the case is tilted in one direction or the liquid in the case surges in said one direction to such an extent that said other end of the vent pipe is momentarily exposed to atmosphere to have the liquid therein flow into said enlargement and thus to seal the vent pipe against the inflow of air to the reservoir.

5. The combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and terminating at the level at which the liquid is to be maintained, and adapted when the liquid in the case drops below said predetermined level and exposes to atmosphere its said other end to introduce air into the reservoir for liquid feeding purposes, a U-shaped tube extending from and communicating with said other end of the vent pipe, and provided at its outer end with a cup-like enlargement beneath said level whereby it is filled with liquid from the case when the case is in normal position, and adapted when the case is tilted or the liquid in the case surges to such an extent that said other end of the vent pipe is momentarily exposed to atmosphere to have the liquid therein flow into said enlargement and thus to seal the vent pipe against the inflow of air to the reservoir.

6. The combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and provided with an enlargement with an aperture therein at the level at which the liquid is to be maintained, and adapted when the liquid in the case drops below said predetermined level and exposes said aperture to atmosphere to vent the reservoir, a plurality of U-shaped tubes extending in different directions from and communicating with said enlargement and adapted to be filled with liquid from the case when the case is in normal position and further adapted when the case is tilted or the liquid in the case surges to such an extent that said aperture is momentarily exposed to atmosphere to have the liquid therein flow into said enlargement and thus seal the vent pipe against inflow of air to the reservoir.

7. The combination with an apparatus designed constantly to maintain liquid in a case at a predetermined level and comprising an air-tight reservoir positioned above said level and adapted to contain a supply of the liquid, a feed pipe having one end thereof connected to the bottom of the reservoir to receive liquid therefrom and its other end terminating in the case at a point beneath said level, and serving when the reservoir is vented to feed liquid from the reservoir to the case, and a vent pipe having one end thereof leading to the top of the reservoir and its other end extending into the case and provided with an enlargement with an aperture therein at the level at which the liquid is to be maintained, and adapted when the liquid in the case drops below said predetermined level and exposes said aperture to atmosphere to vent the reservoir, a plurality of U-shaped tubes extending in different directions from and communicating with the enlargement and provided at their outer ends with cup-shaped members beneath said level whereby they are caused to be filled with the liquid from the case when the case is in normal position and further adapted when the case is tilted or the liquid in the case surges to such an extent that said aperture is momentarily exposed to atmosphere to have the liquid therein flow into said enlargement and thus seal the vent pipe against the inflow of air to the reservoir.

8. In combination with an internal combustion engine for a vehicle, an apparatus for constantly maintaining the oil in the crank case of the engine at a predetermined level comprising an air-tight reservoir positioned above said level and adapted to contain a supply of oil, a feed pipe having one end thereof connected to the bottom of the reservoir to receive oil therefrom and its other end terminating in the crank case at a point beneath said level, and serving when the reservoir is vented to feed oil from the reservoir to the crank case, a vent pipe having one end thereof leading to the top of the reservoir and its other end extending into the crank case and terminating at the level at which the oil is to be maintained, and adapted when the oil in the crank case drops below said predetermined level and exposes to atmosphere its said other end to introduce air into the reservoir for oil feeding purposes, and means for automatically preventing the flow of air through the vent pipe into the reservoir when said other end of the vent pipe is momentarily exposed to atmosphere as a result of either sidewise or lengthwise tilting of the engine or surging of the oil in the crank case in any direction.

9. A vent pipe comprising a horizontal section and a U-shaped section apertured near its connection with said horizontal section.

10. A vent device comprising a hollow element with an aperture therein and a plurality of U-shaped tubes radiating in different directions from, an in communication with, said element and having the outer ends thereof extending upwardly and terminating beneath the level of said aperture.

MAX WEBER.